United States Patent [19]

Hardwick

[11] 4,333,597
[45] Jun. 8, 1982

[54] METHOD OF EXPLOSIVELY FORMING BI-METAL TUBEPLATE JOINTS

[75] Inventor: Roy Hardwick, Louisville, Colo.

[73] Assignee: Explosive Fabricators, Louisville, Colo.

[21] Appl. No.: 153,047

[22] Filed: May 27, 1980

[51] Int. Cl.³ .................................................. B23K 20/08
[52] U.S. Cl. ........................................ 228/108; 228/109; 228/183
[58] Field of Search ............... 228/107, 108, 109, 183, 228/190

[56] References Cited

U.S. PATENT DOCUMENTS

| | | | |
|---|---|---|---|
| 3,233,312 | 2/1966 | Cowan et al. | 228/109 X |
| 3,503,110 | 3/1970 | Berry et al. | 228/183 X |
| 3,717,925 | 2/1973 | Hardwick | 228/183 X |
| 3,813,758 | 6/1974 | Araki | 228/108 |

Primary Examiner—Gus T. Hampilos
Attorney, Agent, or Firm—Fields, Lewis, Pittenger & Rost

[57] ABSTRACT

A tubejoint for a heat exchanger made of two dissimilar materials is provided wherein the tubeplate joint is manufactured by use of an explosive having a detonation velocity more than 120 percent of the sonic velocity of the tube materials to be welded. Very satisfactory welds are formed at subsonic velocity between the surfaces of concentric tubes made of dissimilar metal and along the surface of a counterbore formed in the hole in which the composite tube is placed. The joint thus formed prevents any corrosive fluid on the tube side of the joint from coming in contact with any non-compatible material on the shell side of the heat exchanger and also prevents any corrosive fluid on the shell side of the heat exchanger from coming in contact with incompatible material on the tube side of the heat exchanger. In the joint construction, a thimble made of the same material as the inner tube and as a clad layer on the tube side of the tubeplate is welded both to the tubeplate and to the inner tube to prevent any passage of fluid therethrough from the tube side to the shell side. A mechanical joint is formed on the shell side to prevent passage of fluid from the shell side through the aperture in the tubeplate to the tube side.

7 Claims, 3 Drawing Figures

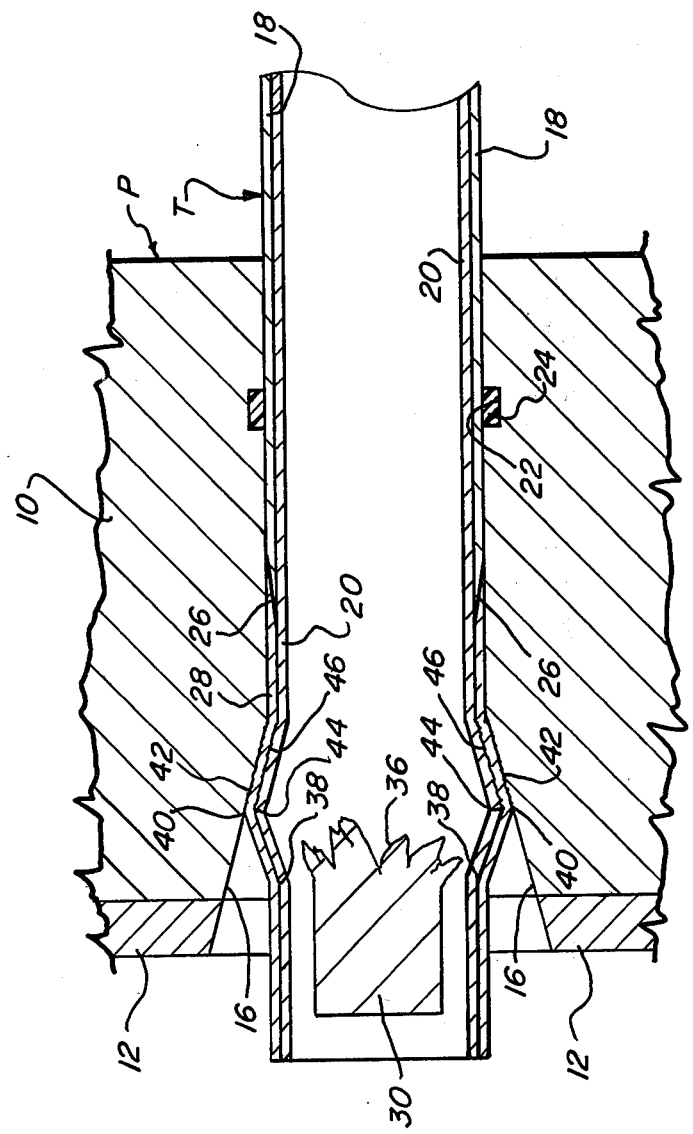
Fig_2

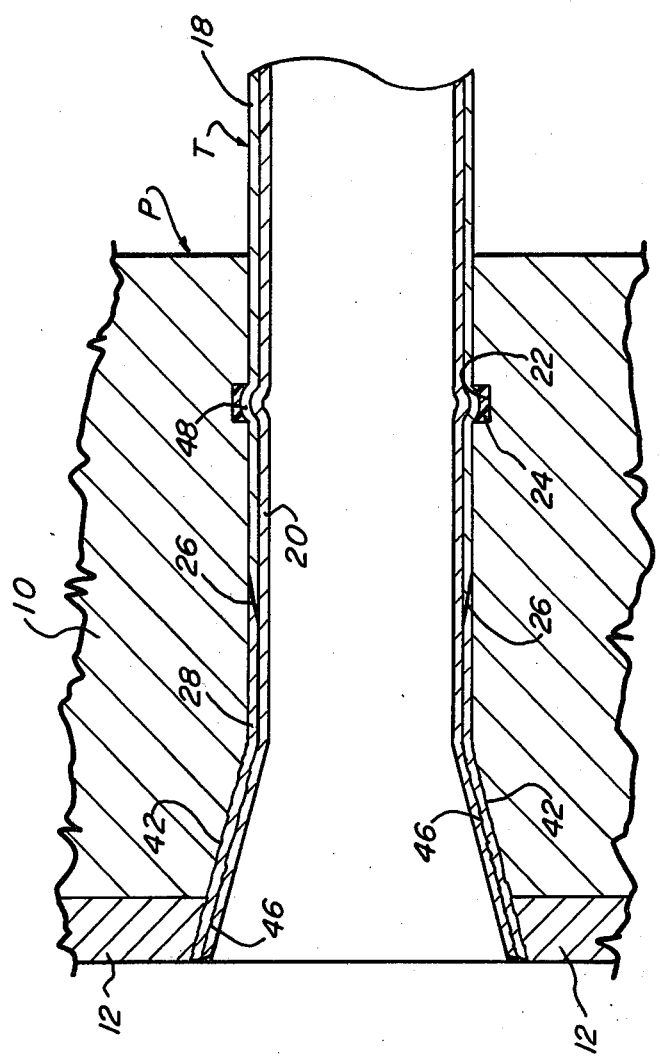
Fig_3

METHOD OF EXPLOSIVELY FORMING BI-METAL TUBEPLATE JOINTS

DESCRIPTION

1. Technical Field

This invention relates to a bi-metal tubeplate joint and a method for making the joint wherein an explosive whose detonation velocity is greater than the sonic velocity of the material being welded is used to make a welded joint at subsonic velocity. A tubeplate joint thus formed has application in heat-exchanger construction.

2. Background Art

Bi-metal tubes have been used in heat exchanger construction over a period of many years. Bi-metal tubes are used in heat exchangers in which there are two differing corrosive fluids flowing, one on the shell side (exterior of the tube) and the other on the tube side (interior of the tube). It is sometimes difficult to find a tube material which is not susceptible to corrosion from at least one of the two fluid environments and consequently a bi-metal tube is made, the outer tube being resistant to the shell side environment and the inner tube to the tube side environment. In the past, one way of making these tubes was by co-drawing, i.e., a first tube made from one metal is placed inside a second tube made from a second metal and both tubes are drawn through a die and over a mandrel to form a composite tube. To effect this co-drawing, the inner tube must fit reasonably tight within the outer tube. The composite thickness will just exceed that of the final co-drawn dimension. The thickness of the two tubes must be of reasonable dimension to promote the required hoop-stresses which will maintain the two tubes in contact at their interface. The requirements outlined above provide a tube which is less than ideal in that its composite thickness is so great that it results in relatively low heat transfer across the tube wall. Additionally, thermal and fatigue cycling, arising during the operation of the heat exchanger, usually results in separation along the contact area at the interface whereby the resulting gap will further inhibit heat transfer.

More recently, a new type of bi-metal tube has been produced. The innovative feature of this new tube is that the outer and inner tubes are explosively bonded together so that a metallurgical bond exists between the two tubes at the interface. Appropriate size tubes are selected at relatively large diameters and thicknesses and these two tubes are explosively bonded to form a composite shell, (i.e., a tube of large diameter and wall thickness). This composite tube can then be drawn down as if it were a single entity due to the strength of the interfacial bond. This was not possible with co-drawn tubing as it merely resulted in the preferential drawing of the lower yield strength material. However, in the case of the bonded composite, the strength of the bond prevents this preferential drawing. As this composite tube behaves as a single entity, it is possible for it to be drawn down to a much thinner gauge than could be done by the co-drawing technique. Thus, the composite has improved heat transfer characteristics. Due to the strength of the bond, thermal and fatigue cycling resulting from operating stresses cannot adversely affect the bond and thus, again, heat transfer characteristics are maintained. As pointed out, one of the principal uses of bi-metal tubes is in heat exchangers. For this purpose, they must typically be bonded to a tube sheet which normally has a plurality of apertures for supporting a plurality of tubes. Typically, the tube sheet is also bi-metal, one side being made of a metal which is compatible with a fluid circulated through the tubes and the other side being compatible with a fluid which is circulated outside of the tubes in heat exchange relationship. Conveniently, the side of the tubeplate which is made of material compatible with the fluid circulating through the tubes is made of the same material as the interior of the tube whereas the other side of the tubeplate is made of the same material as the outside of the tubes. Thus, it is necessary to bond the tubes to the tubeplates so that only metal which is compatible with the fluid circulated through the tubes is contacted by this fluid and only metal which is compatible with the fluid circulated outside of the tubes comes in contact with this fluid. Thus, where the tube extends through the tubeplate to the tube side, some means must be provided for covering or removing the outside of the tube in this area so that it will not be exposed to the hostile environment of the fluid flowing through the tubes.

There are three common techniques for joining tubes to tubesheets, namely by mechanical expansion, fusion welding and explosive welding. Mechanical expansion has the drawback in that it is difficult to make a tight bond which will prevent the penetration of hostile fluids at the joint. Diffusion welding is often difficult to accomplish because the materials used in the inner and outer tubes are incompatible for fusion welding or are difficult to weld consistantly. As a result, fusion welding is not normally adapted for joining of metal tubes.

A method of explosive welding a bi-metal tube is outlined in my British Pat. No. 1,288,166. In this method, the outer tube is removed over a short distance and a gradual taper is produced on the outer tube to prevent an abrupt change in section, which would act as a stress raiser and promote fracture during welding at this point. The juncture of the exposed outer surface of the inner tube and the start of the taper on the outer tube is critically placed at a point halfway along the angle length so that upon detonation of the explosive, the tube is forced outwards and the weld is made along the angular portion of the outer tube and the inner half of the tube plate angle, and additionally, between the outer surface of the inner tube and the remaining outer half of the angle. While such an arrangement is satisfactory for relatively thick bi-metal tubes, it would be extremely difficult to achieve such a weld with the relatively thin composite of the explosively bonded bi-metal tube.

DISCLOSURE OF INVENTION

In accordance with this invention, a tubeplate joint has been provided wherein relatively thin composite bi-metal tubes may be welded to a tubeplate. More particularly, the tubeplate structure comprises a tubeplate having at least one aperture therethrough made of a first metal which is resistive to fluid from the shell side of the exchanger and clad with a second dissimilar metal layer on the tube side of the exchanger which is resistive to fluid on the tube side of the exchanger. A conical counterbore is provided on the tube side of the aperture and extends through the dissimilar metal layer into the plate. A composite tube comprising an inner tube of the dissimilar metal within and parallel to the outer tube is positioned within the aperture of the tubeplate. A portion of the outer tube is removed and replaced with a thimble or sleeve made of the dissimilar metal. The composite tube extends through the aperture so that the end of the composite tube is flush with the dissimilar metal layer and flared against the surface of the counterbore, the thimble extending inward in the aperture beyond the counterbore and welded to the tubeplate only along the counterbore surface of the tubeplate and the dissimilar layer and the inner tube is welded to the thimble only along the flared portion in the counterbore to provide a tube side which is only contiguous to the tube side fluid and a shell side which is only contiguous to the shell side fluid.

This tubejoint construction is accomplished by a novel method wwherein an explosive which has a supersonic detonation velocity can be used to explosively weld the thimble to the counterbore and the inner tube to the thimble at subsonic velocity. This method includes the steps of positioning the first and second metallic members to be bonded in spaced parallel relation, providing an explosive having a detonation velocity greater than 120 percent of the sonic velocity of the metallic member with the greatest sonic velocity adjacent the first one of the members to be clad, positioning an anvil surface adjacent the second member to be clad wherein the striking surface of the anvil is at an angle to the surface of the second member so that when the explosive is ignited, the explosive causes the second member to strike the anvil surface along a collision and pressure point moving at subsonic velocity and become welded thereto and causing the first member to strike the second member along a collision point moving at supersonic velocity and subsequently impact the second member along a pressure point moving at subsonic velocity to weld the first member to the second member.

More particularly, the method involves forming a composite tube having an inner tube and an outer tube in parallel contiguous relation, the tubes being made of dissimilar metal, removing the portion of the end of the outer tube, forming a tubeplate of the same material as the outer tube, and having at least one aperture extending therethrough from a first side to a second side of a size to just receive the composite tube, cladding the second side of the tubeplate with a metal layer made of the same material as the inner tube, countersinking the aperture in the tubeplate from the second side thereof to form a conical surface to act as an anvil through the cladding layer and into the plate, placing a tube section or thimble made of the same metal as the inner tube over the inner tube to replace the removed portion of the outer tube, inserting the composite tube in the tubeplate aperture so that the end having the thimble extends from the aperture through the countersunk portion and out the second side of the plate, placing an explosive charge which has a detonation velocity greater than the sonic velocity of the metal of the inner tube within the inner tube so that it extends through the portion of the composite tube within the countersunk portion of the aperture, igniting the explosive charge at the inner end causing the inner tube to progressively expand and be driven against the thimble along a collision point moving at supersonic velocity toward the outer end of the composite tube to expand the outer tube until it strikes the anvil surface resulting in a first pressure point moving at subsonic velocity as the thimble strikes the anvil at a coincident collision point and a second pressure point moving at subsonic velocity along the interface of the inner tube and thimble as the inner tube impacts the thimble creating a weld between the thimble and the anvil surface of the tubeplate and the cladding layer and between the inner tube and the thimble to form a tube opening on the second side of the tubeplate in which only the dissimilar metal is exposed.

Additional advantages of the invention will become apparent from the description which follows taken in conjunction with the accompanying drawings.

BRIEF DESCRIPTION OF DRAWINGS

FIG. 2 is a horizontal section, similar to FIG. 1, but showing the explosive being detonated and the joint being formed; and FIG. 3 is a horizontal section, similar to FIGS. 1 and 2, showing the completed joint made in accordance with this invention.

BEST MODE FOR CARRYING OUT THE INVENTION

Figure 1:
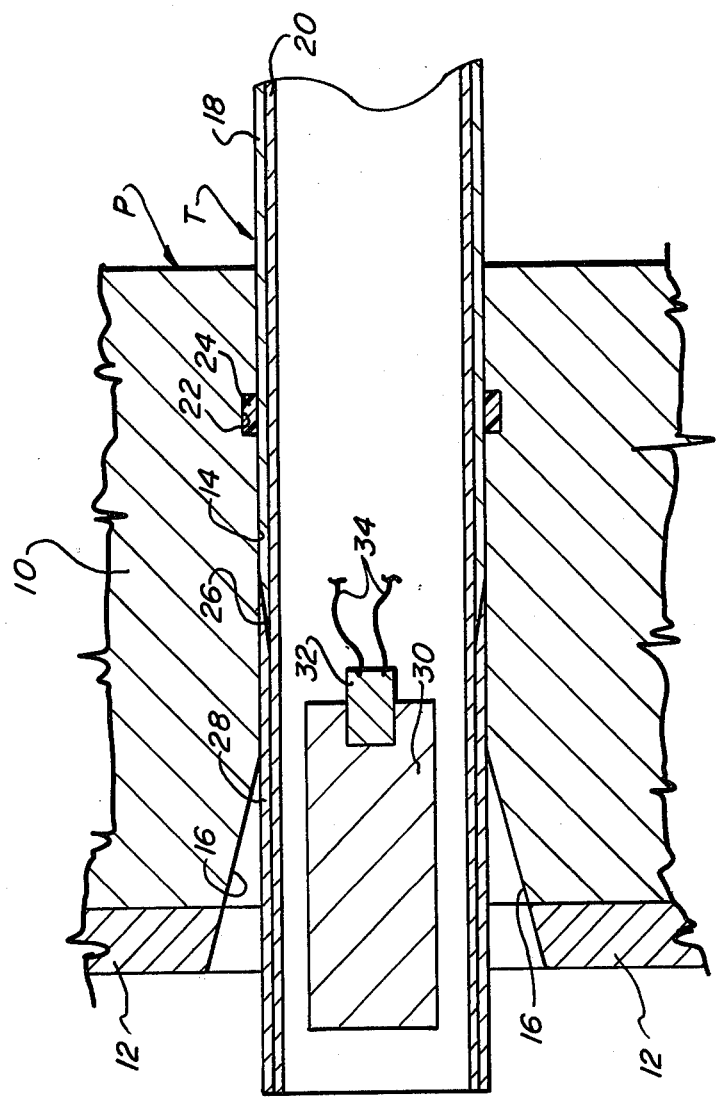
FIG. 1 is a diagramatic horizontal section showing the set-up of the parts for forming a tubejoint structure in accordance with this invention utilizing the method of this invention.

In accordance with this invention, the set-up for forming the novel joint structure of this invention according to the novel method is best seen in FIG. 1. A tubeplate P which comprises a relatively thick layer 10 made of a first metal which will be compatible with the corrosive fluid on the shell side of the evaporator and may optionally be clad with a second thinner layer 12 on the tube side of the conveyor. Conveniently, plate P is provided with an aperture 14 through which composite tube T is positioned with the end extending a short distance beyond the face of layer 12. Also, aperture 14 includes a counterbore 16 which extends through layer 12 and into layer 10 as shown and serves as an anvil surface for forming the joint, in a manner to be described.

Conveniently, composite tube T consists of a composite made up of an outer tube 18 made of the same metal as layer 10 and an inner tube 20 made of the same material as layer 12. A circumferential groove 22 is provided in aperture 14 and is filled with a highly resilient material 24, such as silicon rubber, to form a seal as more fully described below. As seen in FIG. 1, the end of outer tube 18 has been machined away over a substantial length with a transition angle 26 as shown at a point within layer 10 and has been replaced by a sleeve or thimble 28 which is made of the same material as inner tube 20. Conveniently, the thimble 28 has a similar transition angle and this angular configuration is located so that when welding occurs, this juncture is spaced from the area of high stress which will occur along counterbore 16.

Completing the set-up is an explosive 30 positioned within inner tube 20, by means not shown, and having a detonator 32 at the inner end which is connected to a suitable ignition source by wires 34.

It had previously been thought that when two surfaces lie parallel to each other, such as inner tube 20 and thimble 28, they could not be welded using an explosive charge whose detonation velocity exceeds 120 percent of the sonic velocity of the material. This is because the critical collision point velocity between the two surfaces will be identical to the detonation velocity of the explosive and it is essential, as is well known in the art, that the collision point velocity cannot exceed 120 percent of the sonic velocity of the materials if a satisfactory weld is to be made. However, it is well known that a weld can be obtained between two surfaces initially at an angle to each other using explosives whose detonating velocity exceeds 120 percent of the sonic velocity of the materials because the angle causes the critical collision point velocity to be reduced below that of the detonating velocity of the explosive, and consequently, this will produce subsonic collision points because of the angular configuration. In other words, under the teachings of the prior art, it would be expected that thimble 28 would weld to counterbore 16, but that inner tube 20 would not weld to thimble 28. However, the key to this invention is that it is now realized that it is not the collision point but the pressure point which must travel at the subsonic velocity. In many configurations, the collision point and pressure point are one and the same, but in the set-up in FIG. 1, this is not the case with respect to inner tube 20 and thimble 28.

Although it is common to refer to the area where the detonating force is acting as a "point", it will be understood that as used herein, the terms "collision point" and "pressure point" really refers to a front moving along the material in the direction of the detonation, but for simplicity, it will be considered as a point moving in the direction of detonation.

Referring now to FIG. 2, as the detonation progresses, the progressive welding action can be seen. The detonation front 36 progresses axially along explosive 30 causing the outer surface of inner tube 20 to be forced against the inner surface of thimble 28 to form a collision point 38 between the two which travels at supersonic speed, namely the detonation velocity of explosive 30. The mass of the thimble, however, is insufficient to give sufficient pressure at the collision point 38 to produce a weld at the interface of tube 20 and thimble 28. The outer surface of inner tube 20 on contacting the inner surface of thimble 28 causes the thimble to expand outwardly to contact anvil surface 16 of the counterbore and to provide a collision point 40 which travels at a subsonic velocity and is of sufficient pressure to form a weld 42 between the outer surface of thimble 28 and surface 16 of the counterbore. Immediately upon thimble 28 coming in contact with the large mass of tube-plate 10, a pressure point 44 is formed between the outer surface of inner tube 20 and the inner surface of thimble 28. This pressure point will travel at an identical velocity as collision point 40 and a weld 46 is formed between the thimble 28 and inner tube 20.

At the same time, the collision point 38 between the outer surface of inner tube 20 and the inner surface of thimble 28 is still traveling at supersonic velocity, well in advance of pressure point 44 with the portion between these points in intimate contact only and expanding radially outward in unison until they eventually strike the surface of counterbore 16. When the collision point 40 and pressure point 44 reach the extremity of counterbore 16, the surplus length of tube which will protrude beyond layer 12 is severed as it continues to expand beyond the tensile limits of the material of which it is made. At this point, the weld is completed, as shown in FIG. 3. As seen, the weld 42 between the outer surface of thimble 28 and layer 10 of tubeplate P exists along the full length of the counterbore. Similarly, weld 46 exists between the outer surface of inner tube 20 and the inner surface of thimble 28 along this same length so that the corrosive fluid in the tube side of the heat exchanger is only presented to a metal to which it is resistive, namely the metal of inner tube 20, thimble 42 and plate 12.

In a second operation, the composite tube T may be expanded either mechanically or explosively at groove 22 to form a ridge 48 which compresses seal material 24 into groove 22 as shown. The property of sealing material 24 is such that it has the capacity to revert to its original volume despite temperature changes which occur during the service life of the joint. This capacity to revert to original volume causes a joint to be made between seal material 24, groove 22, and ridge 48 of composite tube T. Thus, the completed joint prevents any corrosive fluid on the shell side of the heat exchanger from having access to the material of inner tube 20 or thimble 28 because of this seal formed by ridge 48, sealing material 24, and groove 22.

An example of a joint constructed in accordance with this invention was formed by placing a tube having an outside diameter of 0.875 inches and a wall thickness of 0.048 inches inside a tube having a one inch outside diameter and a wall thickness of 0.064 inches. Both tubes were made of stainless steel, the outside surface of the inner tube being prepared by polishing it with emery and the inside of the outer tube being prepared by the use of a burr. The clearance between the two tubes was approximately 0.03125 inches. Both tubes were made of mild steel having a sonic velocity of approximately 5000 meters per second. The composite tube thus formed was placed in a hole having a diameter of 1.005 to 1.010 inches in a two inch thick mild steel tubeplate. A counterbore having a depth of one-half inch and an included angle of 15° was provided. The explosive used was "DETASHEET" manufactured by E. I. du Pont de Nemours & Company which has a detonation velocity of approximately 7000 meters per second. Thus, a relatively inexpensive but highly efficient joint is formed in the tubeplate by the use of a novel method involving an explosive having a detonation velocity greater than the sonic velocity of the material to be welded. The joint thus formed presents hostile fluids from the tube side of the joint from reaching the materials on the shell side and also prevents hostile fluids from the shell side from reaching the materials on the tube side. Thus, the heat exchanger can be expected to have a long life.

The invention has been described in detail with particular reference to a preferred embodiment thereof, but it will be understood that variations and modifications can be effected within the spirit and scope of the invention.

I claim:

1. A method of explosively bonding two parallel metallic members including the steps of:
   positioning first and second metallic members to be bonded in spaced parallel relationship;
   positioning an explosive having a detonation velocity greater than 120 percent of the sonic velocity of the metallic member with the greater sonic velocity adjacent the first one of the members to be clad;
   positioning a body defining an anvil surface adjacent the second member to be clad, said anvil surface being at an angle to an outer surface of said second member so as to define a progressively enlarging gap therebetween such that when said explosive is ignited, the outer surface of said second member spaced from said anvil surface will strike the anvil surface at a subsonic velocity; and
   igniting the explosive causing the second member to strike the anvil surface along a pressure point moving at subsonic velocity and becoming welded thereto and causing the first member to strike the second member along a collision point moving at supersonic velocity and to subsequently impact said second member along a pressure point moving at subsonic velocity to weld the first member to the second member.

2. A method, as claimed in claim 1, wherein: the first and second members are similar metals.

3. A method, as claimed in claim 1, wherein: the first and second members are cylindrical; and said anvil surface is conical.

4. A method of explosively bonding two cylindrical parallel members to each other and to a body defining a conical anvil surface through which they extend, including the steps of:

positioning an inner metallic tube within an outer metallic tube in contiguous parallel relationship;

placing an outer end of the tubes within a body defining an aperture having a conical anvil surface sloping away from a surface of the outer tube at one side of the aperture;

providing an explosive charge having a detination velocity greater than 120% of the sonic velocity of the metallic tube with the greater sonic velocity within the inner tube extending substantially the length of the conical anvil surface; and igniting the explosive charge at an inner end within the tubes causing the inner tube to progressively expand and be driven against the outer tube along a collision point moving at supersonic velocity toward the outer end of the tubes to expand the outer tube until it strikes the anvil surface resulting in a first pressure point moving at subsonic velocity as the outer tube strikes the anvil surface and a second pressure point moving at subsonic velocity as the inner tube impacts against the now stationary outer tube creating a weld between the surfaces of the anvil and the outer tube and between the surfaces of the outer tube and the inner tube.

5. A method, as claimed in claim 4, wherein: the anvil, outer tube and inner tube are all made of a similar metal.

6. A method of explosively welding a bi-metal tube to a tubeplate, including the steps of:

forming a composite tube having an inner tube and an outer tube in parallel contiguous relationship, said tubes being made of dissimilar metal;

removing a portion of an end of the outer tube;

forming a tubeplate of the same material as the outer tube and having internal walls defining at least one aperture extending therethrough from a first side to a second side and of a size to just receive the composite tube;

cladding the second side of the tubeplate with a metal layer made of the same material as the inner tube;

countersinking the aperture in the tubeplate from the second side thereof to form a conical anvil surface through the cladding layer and into the tubeplate;

placing a tube section or thimble made of the same material as the inner tube over the inner tube to replace the removed portion of the outer tube;

inserting the composite tube in the tubeplate aperture so that the end having the tube section or thimble extends from the first side of the aperture through the countersunk portion and out the second side of the tubeplate.

placing an explosive charge which has a detonation velocity greater than 120% the sonic velocity of the metal of the tube with the greater sonic velocity within the inner tube so that it extends through that portion of the composite tube within the countersunk portion of the aperture; and igniting the explosive charge at an inner end thereof causing the inner tube to progressively expand and be driven against the thimble along a collision point moving at supersonic velocity toward the end of the composite tube to expand the outer tube until it strikes the anvil surface resulting in a first pressure point moving at subsonic velocity as the thimble strikes the anvil and a second pressure point moving at subsonic velocity as the inner tube strikes the now stationary thimble creating a weld between the anvil surface of the tubeplate and cladding layer and the thimble and between the inner tube and the thimble to form a tube opening on the second side of the tubeplate in which only the dissimilar metal is exposed.

7. A method, as claimed in claim 6, wherein: an inner end of the tube section or thimble extends into the aperture beyond the countersunk portion.

* * * * *